United States Patent [19]

Burtness et al.

[11] 4,096,356

[45] Jun. 20, 1978

[54] CALL RESTRICTION ARRANGEMENT

[75] Inventors: Richard Duane Burtness, Boulder, Colo.; Louis Emanuel Thelemaque, Tehran, Iran

[73] Assignee: Bell Telephone Laboratories, Incorporated, Murray Hill, N.J.

[21] Appl. No.: 819,111

[22] Filed: Jul. 26, 1977

[51] Int. Cl.² .................. H04M 1/66; H04M 3/54
[52] U.S. Cl. ........................ 179/18 DA; 179/18 BE
[58] Field of Search .................................. 179/18 DA Primary Examiner—William C. Cooper
Attorney, Agent, or Firm—James M. Graziano; David H. Tannenbaum

[57] ABSTRACT

A PBX call restriction arrangement is disclosed in which a plurality of call rerouting schemes are concurrently provided. The class of service assigned each station is used to define both the types of calls prohibited to the station and the rerouting treatment to be given an attempt by a subscriber at this station to make this prohibited type of call.

17 Claims, 5 Drawing Figures

CALL RESTRICTION ARRANGEMENT

FIELD OF THE INVENTION

This invention relates to telephone switching systems and in particular to a PBX call restriction arrangement which uses the class of service assigned each station to define both the types of calls prohibited to the station and the rerouting treatment to be given an attempt by a subscriber at this station to make this prohibited type of call.

DESCRIPTION OF PRIOR ART

In business communications systems it is desirable to provide call restriction facilities to limit the call origination and call reception capability of particular stations. In prior art systems, the call restriction function is accomplished by assigning each station in the telephone switching system a particular class of service which is indicative of the types of calls prohibited to that station. One such prior art class of service call restriction arrangement is taught by the Shepherd patent, U.S. Pat. No. 2,698,879, issued Jan. 4, 1955. The Shepherd call restriction arrangement assigns a class of service to each station in the telephone switching system to indicate the types of calls prohibited to that station. When a call is originated in the telephone switching system, the Shepherd call restriction facilities determine which class of service is assigned to the station associated with this call. The call restriction facilities then use the assigned class of service to establish whether this type of call is prohibited to that particular station. No action is taken if the call is permitted, but if the call is of a prohibited type, a prohibition indication is supplied to the telephone switching system common control circuit.

The telephone switching system response to a call prohibition indication, such as that supplied by the Shepherd call restriction arrangement, is inherent in the design of the telephone switching system. Some telephone systems reroute all attempted prohibited calls to the attendant, while other systems supply a reorder tone indication to the calling party, and still other telephone systems provide a recorded announcement message to the calling party. However, the response provided is solely determined by the telephone switching system architecture and only a single, uniform treatment is accorded all attempted prohibited calls in the particular telephone switching system.

Thus, the disadvantage of all prior art class of service call restriction arrangements is that all prohibited calls must be handled uniformly and no variety of treatment is provided. In today's sophisticated business communications systems market, such a simplistic call restriction scheme is of limited viability. Today's telephone subscriber desires a more sophisticated and individualistic approach to call restrictions. Customers are familiar with the use of reorder tone trunks, the attendant handling of rerouted calls, as well as recorded announcement arrangements, such as that taught by the W. W. Pharis patent, U.S. Pat. No. 2,892,890, issued June 30, 1959. Additionally, customers are familiar with "hunting" arrangements such as that taught by the Horenkamp patent, U.S. Pat. No. 3,760,118, issued Sept. 18, 1973 wherein calls to a busy station are routed to the next station in a predetermined hierarchy of telephone lines.

Many business customers desire to supply some employees who misdial with a mild form of chastisement, while providing other employees who misdial with a more severe reprimand or screening. To date, such an individualized treatment has been unavailable. All prior art station call restriction facilities handle attempted prohibited calls uniformly, irrespective of the identities of the telephone subscribers involved and irrespective of the type of prohibited call attempted.

In view of the foregoing, an object of this invention is to provide PBX call restriction facilities that concurrently provide a plurality of call rerouting treatments.

It is also an object of this invention to provide PBX call restriction facilities that enable a specific one of a number of call rerouting treatments to be assigned to a station based on the type of prohibited call attempted.

It is also an object of this invention to provide PBX call restriction facilities that enable a specific one of a number of call rerouting treatments to be assigned to a station based on the assigned class of service.

It is also an object of this invention to provide PBX call restriction facilities that enable an attempted prohibited call to be rerouted to a station in the PBX.

It is also an object of this invention to provide PBX call restriction facilities that enable the assigned rerouting treatments to be changed from a remote location, such as from an attendant console.

SUMMARY OF THE INVENTION

In accordance with our invention, we provide call restriction facilities that supply a variety of call rerouting treatments. This is accomplished by assigning a class of service to each station in the telephone switching system indicative of both the types of calls prohibited to the station and the rerouting treatment to be applied to a prohibited call attempted by this station. The various rerouting treatments provided include: rerouting the call to the attendant, rerouting the call to a reorder tone trunk, rerouting the call to a recorded announcement machine, or rerouting the call to another station in the same telephone switching system by expunging the dialed number and substituting another number, either predetermined or a function of the dialed number.

Accordingly, it is a feature of this invention to provide call restriction facilities that supply a plurality of call rerouting treatments.

It is a further feature of this invention to provide call restriction facilities wherein the class of service assigned a station indicates both the types of calls prohibited and the rerouting treatments to be given an attempted prohibited call.

It is a further feature of this invention to provide call restriction facilities that are programmable.

BRIEF DESCRIPTION OF THE DRAWING

The operation and utilization of the present invention will be more fully apparent from the following description of the drawing in which.

GENERAL DESCRIPTION

Figure 1:
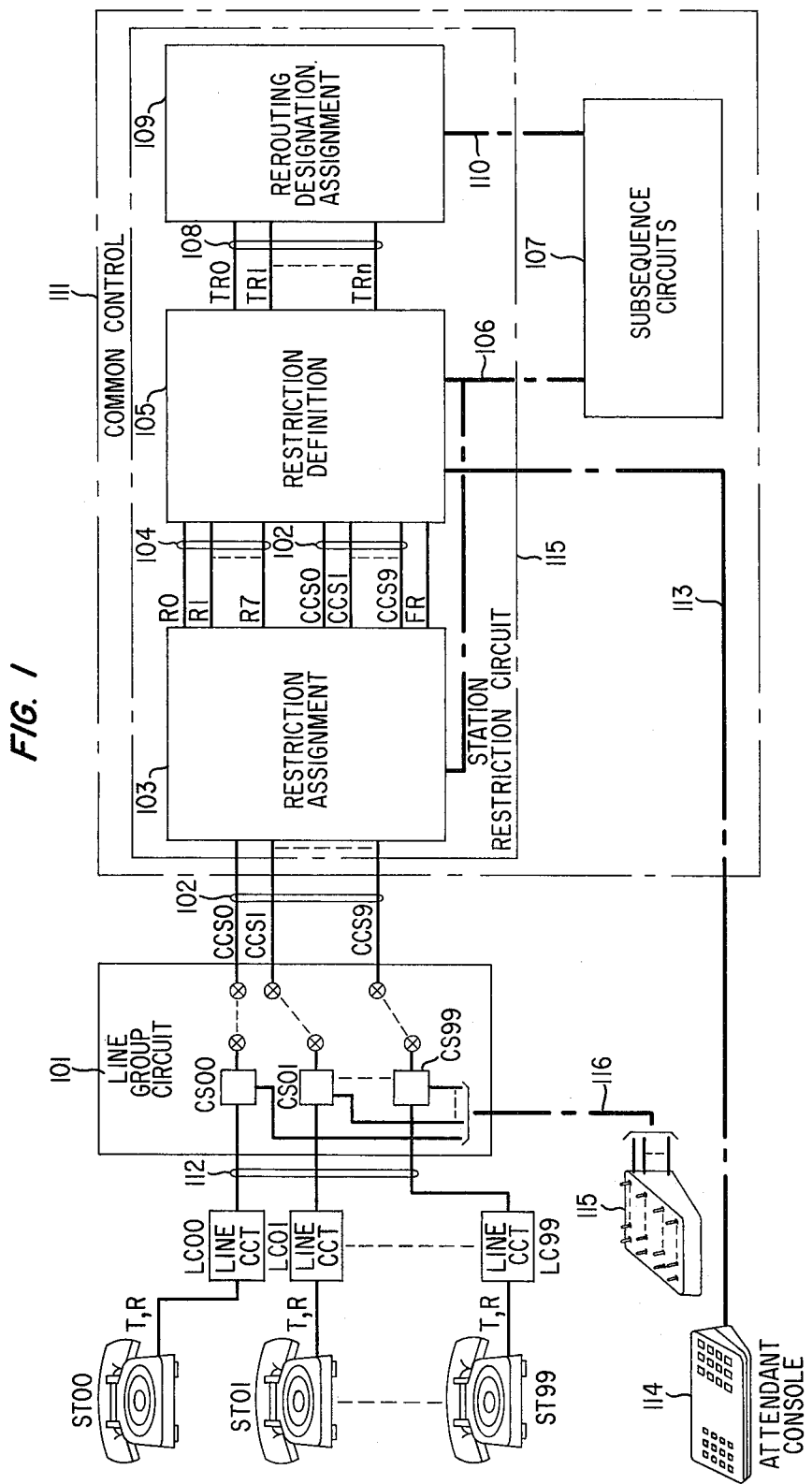
FIG. 1 illustrates one embodiment of the invention in block diagram form.

FIG. 1 shows the broader system aspects of our invention. The call restriction apparatus comprising our invention typically resides in a wired logic, electronic type PBX of the type disclosed in detail in the E. J.

Braun et al patent, U.S. Pat. No. 4,022,983 issued May 10, 1977. Therefore, the Braun et al specification is hereby incorporated as a part of the present specification to the same extent as if fully set forth herein.

The call restriction apparatus comprising our invention as well as the PBX system in which it resides are shown in FIG. 1. The PBX system includes a plurality of PBX stations, ST00 through ST99, each of which is connected via tip and ring conductors to a corresponding one of line circuits LC00 through LC99. Each line circuit in turn is connected by means of various station identification conductors 112 to a line group circuit 101, wherein each station is connected to an associated class of service selector CS00 through CS99. Each class of service selector CS00 through CS99 is connected by two conductors of cable 116 to switch console 115 wherein the two conductors associated with a particular class of service selector are connected to a switch (not shown) dedicated to the associated station set. These switches on console 115 control switching circuitry in the class of service selectors which select one of up to three of the available classes of service by connecting the appropriate station identification conductor through the associated switching circuit to up to three of the class of service conductors SCS0 through SCS9.

This class of service apparatus functions whenever a subscriber at one of the PBX stations goes off-hook to initiate a call. The PBX common control circuit recognizes the station's off-hook status as a request for service and scans the line circuits to identify the requesting station. As described in the aforementioned Braun patent, the PBX common control circuit scans the line circuits via control leads (not shown) and activates the line circuit associated with the station requesting service. The activated line circuit places a low signal on its station identification conductor, which signal passes through the line group circuit 101 switching circuit and cross-connect field to the designated one of the class of service conductors CCS0 through CCS9. Class of service conductors CCS0 through CCS9 comprise cable 102 and are routed to common control circuit 111 wherein they are connected to call restriction apparatus 115, and, in particular, to restriction assignment circuit 103. Restriction assignment circuit 103 assigns one or more of the various types of restrictions to each class of service in the telephone switching system. Thus, assume that station ST00 is associated with class of service 1, which class of service is assigned restrictions 0 and 7. Then, every time station ST00 is involved in a call, the associated line circuit LC00 is activated. Line circuit LC00 places a signal on its station identification lead, which activates the class of service lead CCS1 associated with station ST00. Activated class of service lead CCS1, in turn, activates restriction leads R0 and R7, thereby indicating that station ST00 is assigned restrictions 0 and 7.

The restriction assignment output conductors R0 through R7 are connected to a restriction definition circuit 105 wherein the restrictions themselves are defined. Restriction definition involves establishing a logical combination of call conditions for each restriction type, which conditions, when satisfied, activate the appropriate restriction definition output lead TR0 to TRn. The call condition information is obtained from logic leads 106 which are connected to subsequence circuits 107. The subsequence circuits control the call processing and indicate the present call condition. Thus, each restriction type requires that a unique combination of call conditions be satisfied to generate a call prohibition indication on the restriction definition output leads.

The restriction definition output leads are connected to call rerouting destination assignment circuit 109 wherein each restriction definition output lead is assigned one of a plurality of call rerouting treatments. The treatment selected activates one of a plurality of control leads 110 connected to common control subsequence circuits 107. This activated control lead resets the presently activated call subsequence circuit and activates another call subsequence circuit, thereby rerouting the existing call to another destination. The destination of the rerouted existing call is solely determined by the class of service assigned to the station and the call rerouting treatment assigned to that particular class of service.

In addition to the abovementioned apparatus, attendant console 114 is connected to restriction definition circuit 105 by conductors 113. Switches (not shown) on the attendant console can be operated to change the rerouting call treatment associated with a particular class of service. Likewise, a timer circuit (not shown) may be employed in place of the switches on the attendant console to automatically change the rerouting call treatment.

Thus, the class of service assigned a station may be translated into one or more call restriction types. Each call restriction type in turn is defined and used along with the assigned class of service to activate a selected one of the available rerouting treatments. Thus, the assigned class of service determines not only the type of calls prohibited to a station but also what call rerouting treatment should be applied to an attempt by a subscriber at this station to make this prohibited type of call.

Detailed Description — FIGS. 2 through 5

Figure 2:
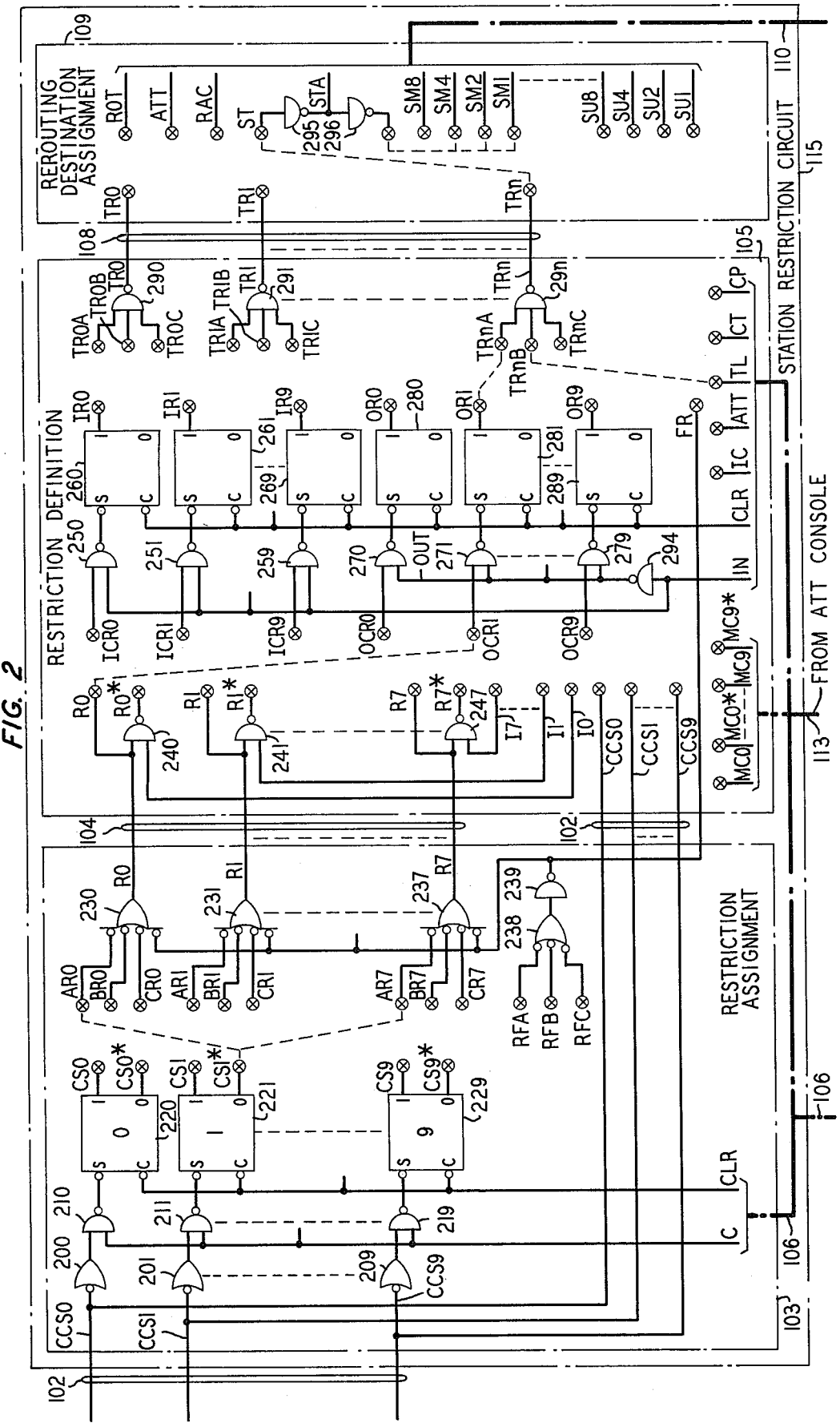
FIGS. 2, 3 and 4 are a detailed circuit diagram of a preferred embodiment of the invention.
Figure 3:
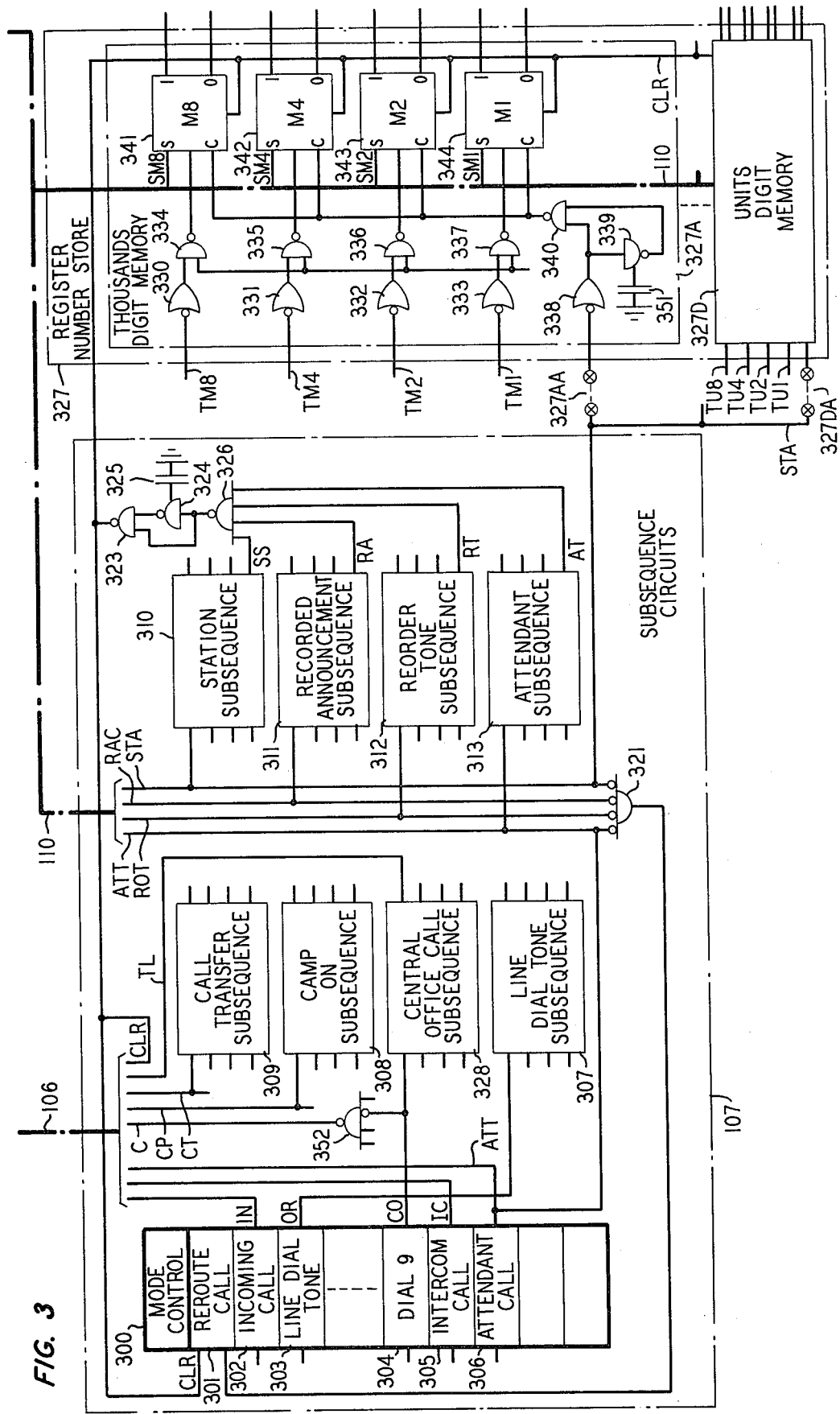
Figures 4, 5:
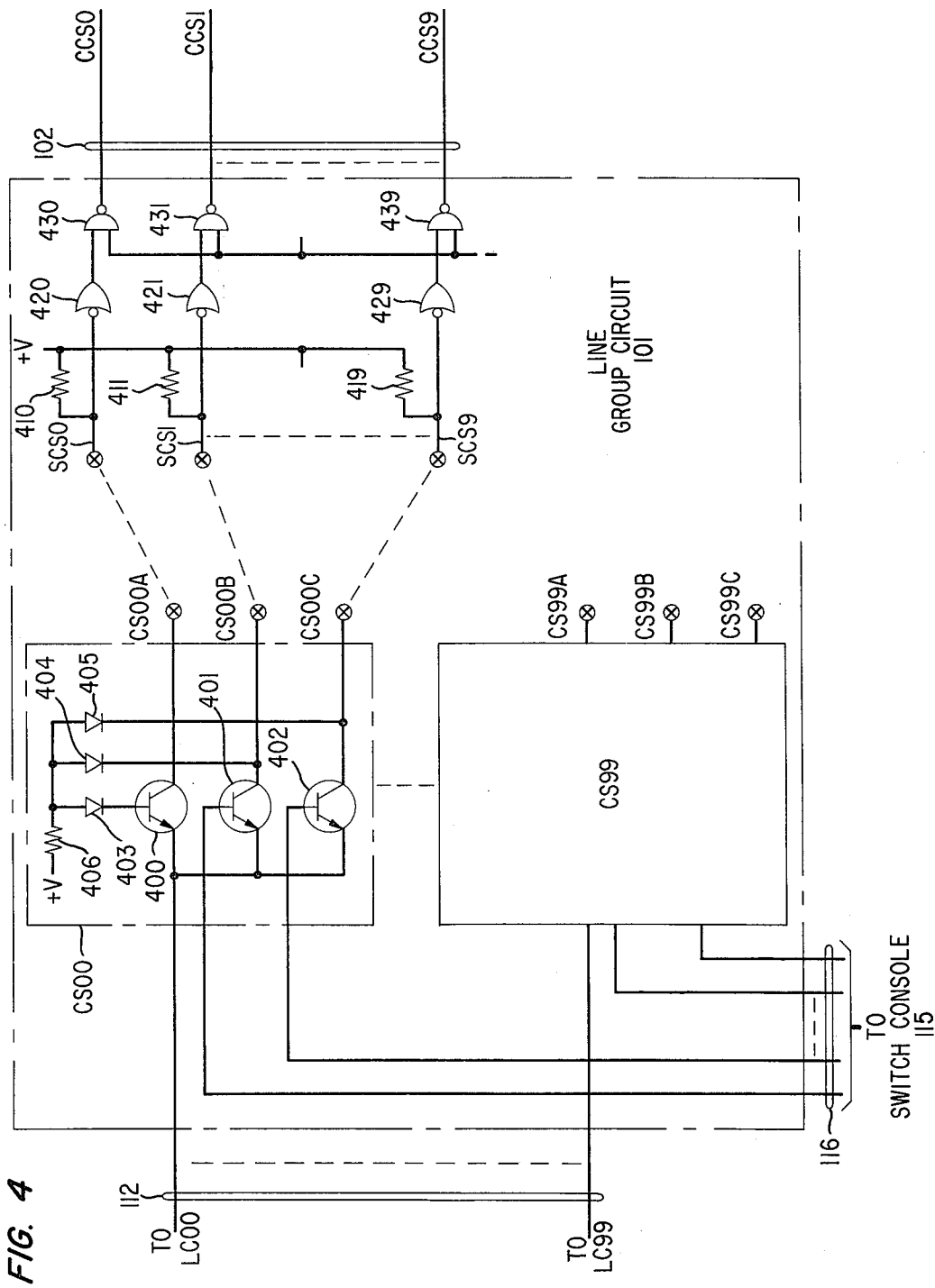
FIG. 5 shows the manner in which FIGS. 2, 3 and 4 should be arranged.

FIGS. 2, 3 and 4 when arranged with respect to each other as shown in FIG. 5, disclose a preferred embodiment of the call restriction apparatus illustrated in FIG. 1. The common control subsequence circuits and the elements of the disclosed call restriction apparatus are arranged with respect to each other in FIGS. 2, 3 and 4 in a manner analogous to that of FIG. 1. For simplicity sake, details of the PBX system in which the disclosed call restriction apparatus resides are omitted from FIGS. 2, 3 and 4. These elements are well known in the art and are not essential for the description of the disclosed call restriction arrangement.

The description of FIGS. 2, 3 and 4 is made with reference to the same call conditions assumed for FIG. 1; namely, station ST00 (not shown) is assigned class of service 1, and restrictions 0 and 7 are associated with class of service 1. In addition, assume that restrictions 0 and 7 respectively indicate prohibition from originating outgoing central office calls and prohibition from receiving incoming central office calls. Assume further that a subscriber at station ST00 is attempting to initiate an outgoing central office call despite the restricted nature of service supplied to station ST00.

Class of Service Indication

In attempting to initiate an outgoing call, the subscriber at station ST00 goes off-hook, receives dial tone from a dial pulse register circuit (not shown) and then dials 9 to access an outside line. These actions by the subscriber at station ST00 activate the PBX common control circuit 107, which determines the station class of service. In particular, as described in the aforementioned Braun et al patent, mode control circuit 300 is activated by a service request, in this case the subscriber at station ST00 going off-hook, and requesting an outside line by dialing 9. Mode control circuit 300 responds to this request for service by activating dial 9 mode circuit 304, which circuit places a high signal on lead CO to indicate that a station in the PBX wishes to initiate an outgoing central office call. A high signal on lead CO activates central office call subsequence circuit 328, which causes a line scanner circuit (not shown) to scan the line circuits (not shown) to identify the station requesting service by locating the line circuit associated with the requesting station. In addition, the high signal on lead CO causes gate 352 of common control 107 to turn off. Gate 352 off places a high signal on lead C which enables gates 210 to 219 in restriction assignment circuit 103 of call restriction circuit 115. When the line circuit (LC00) associated with the requesting station is identified by the line scanner circuit, central office call subsequence circuit 328 causes this line circuit to place a low signal on its associated station identification lead which is connected to line group circuit 101 of FIG. 4.

The station identification lead associated with station ST00 is connected to the class of service selection circuit (CS00) in line group circuit 101 associated with station ST00.

Class of Service Selector

As previously mentioned, class of service selectors CS00 through CS99, associated with stations ST00 through ST99, function under control of switch console 115 to select one of up to three of the available classes of service assigned to the associated station. This is accomplished by interposing transistors 400, 401, and 402 between the station identification lead and class of service selector circuit CS00 output terminals CS00A, CS00B, and CS00C. The emitter terminals of transistors 400, 401, and 402 are all connected to the station identification lead while the collectors of transistors 400, 401, and 402 are connected to terminals CS00A, CS00B, and CS00C, respectively. Thus, the application of a positive voltage control signal to the base of one of transistors 400, 401, or 402 causes the selected transistor to establish a direct connection between the station identification lead and the output terminal associated with the selected transistor, thereby selecting one of the three possible selector circuit outputs. The base of transistor 400 is connected through diode 403, resistor 406 to positive voltage +V, thereby biasing transistor 400 normally on. The bases of transistors 401 and 402 are connected by two conductors of cable 116 to an associated switch (not shown) on switch console 115 (not shown). The associated switch on switch console 115 is an ON-ON-ON switch and operates to: place a positive voltage on the base of transistor 401; place no signal on the bases of transistors 401 and 402; place a positive signal on the base of transistor 402; respectively. The collectors of transistors 401 and 402 are connected through diodes 404 and 405, respectively, and resistor 406 to positive voltage +V. Thus, if a positive voltage control signal was applied to the base of transistor 401 by the associated switch, current would flow from positive voltage source +V through resistor 406, diode 404, and through activated transistor 401, thereby back biasing diode 403 and turning off normally on transistor 400. Transistor 402 operates in similar fashion, when selected, to turn off transistor 400. Thus, a person at remotely located switch console 115 can select one of three possible outputs of each class of service selector by merely operating the three-position switch on the switch console associated with the class of service selector.

The outputs CS00A, CS00B, and CS00C of class of service selector CS00 can be cross-connected to selected ones of class of service leads SCS0 through SCS9. In the present situation, outputs CS00A, CS00B, CS00C are cross-connected to class of service leads SCS0, SCS1, and SCS9, respectively, thereby enabling a person at remotely-located switch console 115 to select the one of classes of service 0, 1 or 9 that is presently assigned to station ST00. For the present case, assume that the switch on switch console 115 associated with station ST00 is operated so as to activate transistor 401 thereby directly connecting station ST00 station identification lead to lead SCS1. Therefore, the low signal placed by line circuit LC00 on the station identification lead is connected through transistor 401 to lead SCS1 where it turns off gate 421. Gate 421 turning off places a high signal on one input of gate 431.

The other input of gate 431 is connected to a maintenance lead from the line group circuit which normally has impressed thereon a high signal. Thus, gate 431 turns on, placing a low signal on lead CCS1. Thus, the low signal placed by line circuit LC00 on its associated station identification lead activates lead CCS1, which causes gate 201 in restriction assignment circuit 103 to turn off, placing a high signal on its output. The output of gate 201 being high in conjunction with the aforementioned high signal on lead C activates gate 211, which places a low signal on its output to set flip-flop 221. Flip-flops 220 to 229 function to store the class of service indication, which in this class is class of service 1. Therefore, flip-flop 221 is activated, to indicate that the class of service assigned to the station originating this call is class of service 1.

Restriction Assignment

As previously mentioned, class of service 1 is associated with restrictions 0 and 7. Therefore, the output of flip-flop 221 is cross-connected to selected inputs of the restriction gates 230 to 237 to indicate the restriction types associated with class of service 1. Thus, in the present example, the output of flip-flop 221, lead CS1*, is cross-connected to input AR0 of gate 230 and input AR7 of gate 237 to thereby indicate the association between class of service 1 and restriction types 0 and 7. Since flip-flop 221 is set, it maintains a low signal on lead CS1*, which activates gates 230 and 237 since the other input terminals of these gates are open. Gates 230 and 237 are turned off by the signal on lead CS1* and, thus, the outputs of these two gates, leads R0 and R7 will be switched high. Therefore, an indication of the class of service associated with station ST00 is stored in flip-flop 221 of restriction assignment circuit 103 and this flip-flop activates the restrictions associated with class of service 1 (restrictions 0 and 7) by placing a high signal on lead R0 and R7 thereby indicating the restrictions applicable to this call.

Restriction Definition

Restriction definition circuit 105 functions to define the restrictions 0 through 7 in terms of the call situations prohibited. In the instant case, restriction 0 indicates prohibition from originating outgoung central office calls, while restriction 7 indicates prohibition from receiving incoming central office calls. Therefore, since station ST00 is attempting to initiate an outgoing central office call, it would be illustrative to follow the restriction definition associated with restriction 0. Restriction 0 is activated by flip-flop 221 turning on gate 230. The output of gate 230, lead R0, is high, switching gate 240 on, thereby placing a low signal on lead R0*. Since restriction 0 is associated with an outgoing call, lead R0 is cross-connected to any one of the leads of the outgoing call group of restriction definition circuit 105, consisting of leads OCR0 to OCR9. In this example, assume that lead R0 has been cross-connected to lead OCR1, then the high signal on lead R0 is carried over to lead OCR1 and the input of gate 271. Since this is an outgoing call, the incoming call mode circuit 302 of mode control circuit 300 is not activated and therefore lead IN, associated with incoming call mode circuit 302, is low. the low signal on lead IN causes gate 294 of restriction definition circuit 105 to turn off, thereby bringing lead OUT high. The high signal on lead OUT in conjunction with the aforementioned high signal on lead OCR1 turns on gate 271, setting flip-flop 281. Flip-flop 281 set causes the 1 output of flip-flop 281, lead OR1, to be high. Therefore, lead R0 activated activates lead OCR1 indicating that restriction 0 maps to outgoing restriction type 1 as indicated by lead OR1. Restriction definition circuit 105 further defines outgoing restriction type 1 by cross-connecting lead OR1, the output of flip-flop 281, to one of the restriction gates 290 to 29n along with the applicable call status leads from cable 106 from common control circuit 107.

Assume that lead OR1 is cross-connected to input lead TRnA of gate 29n. The other input leads TRnB and TRnC of gate 29n are therefore available to define the outgoing call restriction associated with outgoing call restriction type 1. In the instant case, outgoing restriction type 1 is defined to be a prohibition from originating outgoing central office calls. Therefore, one of the two unused inputs of gates 29n must be cross-connected to the call status leads from common control that indicate a central office call. The common control circuit subsequence circuit labeled "central office call subsequence circuit" 328 provides an output lead TL that indicates that a central office call is being processed. Therefore, a cross-connecting lead TL from cable 106 of restriction definition circuit 105 to input TRnB of gate 29n provides the requisite logic to indicate the call conditions necessary to prohibit the attempted central office call. To wit, leads R0 and OCR1 indicate that the station associated with this call is subject to restriction from making the type of calls enumerated by leads OUT and TL, which indicate outgoing and central office respectively. However, the rerouting treatment to be given this attempted prohibited call is determined by the class of service assigned the station associated with this call. Therefore, the remaining input, TRnC, of gate 29n is cross-connected to class of service lead CCS1 of cable 102 to indicate that stations with class of service 1 satisfying these prohibition conditions are to be provided with a particular rerouting treatment. Thus, the concurrent activation of leads SCS1, OUT and TL turn on gate 29n, placing a low signal on lead TRn which signal indicates that the call in progress has satisfied all the prerequisite prohibition conditions assigned to the station associated with this call.

Thus, each restriction type (R0-R7) may be cross-connected to a plurality of outgoing/incoming call group restriction leads (OCR0-OCR9/ICR0-ICR9) and conversely, each outgoing/incoming call group restriction lead (OCR0-OCR9/ICR0-ICR9) may be cross-connected to a plurality of restriction types (R0-R7). Similarly, each incomning/outgoing restriction (IR0-IR9/OR0-OR9) may enable a plurality of treatment gates 290-29n. Therefore, to obtain individualized rerouting treatment, the class of service leads CCS0-CCS9 are cross-connected to inputs on treatment gates 290-29n to differentiate between the rerouting treatments to be given each station.

Rerouting Destination Assignment

The output of restriction definition circuit 105 comprises treatment leads TR0 through TRn, comprising cable 108 which is connected to rerouting destination assignment circuit 109. Each one of the treatment leads TR0 through TRn is associated with a unique combination of call conditions and assigned class of service. If the call in progress satisfied one of the aforementioned unique combinations, the treatment associated with this combination will be activated to indicate an attempted prohibited call. Thus, in the instant case, treatment lead TRn is activated, placing a signal on the input of rerouting destination assignment circuit 109. Rerouting destination assignment circuit 109 assigns one of the available call rerouting treatments to each one of the treatment leads TR- from restriction definition circuit 105. Thus, each prohibited combination of call conditions gives rise to one of the unique TR- leads being activated, which lead in turn is specifically assigned one of the rerouting treatments available in the PBX. In the present example, it has been seen that activated lead TRn is associated with a subscriber at station ST00 attempting to make a prohibited outgoing central office call. Now assume that all attempted prohibited calls from stations having class of service 1 are to be routed to PBX station 7314. Then, since station ST00 is assigned class of service 1, lead TRn would be cross-connected in rerouting destination assignment circuit 109 to lead STA, indicating that prohibited calls from stations with class of service 1 should be rerouted to the designated station. The high signal on lead TRn thereby places a high signal on lead STA which activates station subsequence circuit 310 of common control 107. The station subsequence circuit establishes a connection between the calling station and the station whose number is stored in the register number store 327. In the instant case, station ST00 dialed 9 to access a central office line. Therefore, the contents of the register number store are the digit 9. To reroute this call to PBX station 7314, the digit 9 must be expunged from register number store 327 and the digits 7314 placed therein in order that station subsequence circuit 310 direct the connection of station ST00 to the proper destination. This is accomplished by the high signal on lead STA clearing the memory of the register number store and reading in the digits 7314.

Register Number Store

Register number store 327 consists of four blocks of memory 327A through 327D each of which represents one digit of the four possible dialed station number digits. For illustrative purposes, the details of only block 327A are disclosed in the drawing although the remaining three blocks contain identical circuitry.

Blocks 327A to 327D comprise thousands, hundreds, tens, units digit memory respectively. Thousands digit memory 327A comprises four flip-flops 341 to 344 which function to store the dialed thousands digit in binary form with flip-flops 341 to 344 representing 8, 4, 2, 1 respectively. A digit may be stored in flip-flops 341 to 344 in one of two manners. First, dialed digit data may be present on the register bus leads TM8-TM1, which data signals are inverted by buffer gates 330 to 333. This data then may be strobed into flip-flops 341 to 344 by strobe gates 334 to 337. Alternatively, data may be entered into flip-flops 341 to 344 by appropriate data signals being placed on leads SM8 to SM1 by rerouting destination assignment circuit 109. In particular, the low signal on lead TR$n$ is inverted by gate 295, which places a high signal on lead STA. The high signal on lead STA is inverted by gate 350 in register number store 327. The low signal on the output of turned on gate 350 activates a pulse generator circuit comprising gates 338, 339, 340 and capacitor 351. Gate 338 turns off in response to gate 350 turning on and momentarily turns on gate 340. Gate 339 is delayed in its operation by capacitor 351 and, therefore, gate 340 remains on until gate 339 turns on, turning off gate 340. The resultant momentary low signal on the output of gate 340 clears all the flip-flops (341-344) of thousands digit memory 327A. Meanwhile, the high signal on lead STA is inverted by gate 296 of rerouting destination assignment circuit 109 and applied via cross-connections to selected ones of leads SM8 to SM1. In the instant case, the cell is to be rerouted to station 7314 so leads SM4, SM2 and SM1 must be cross-connected to the output of gate 296 to generate the thousands digit 7. In a similar fashion, the hundreds, tens, and units digits are assigned in rerouting destination assignment circuit 109 so that the station number 7314 will be entered into register number store 327.

With the digits 7314 stored in register number store 327, subsequence circuit 310, activated by the high signal on lead STA, proceeds in well known fashion to connect the calling party (Station ST00) to the called party, which in this case is station 7314. The original call sequence — central office call subsequence — has been aborted by the high signal on lead STA activating gate 321, activating gate 322, which, in turn, activates reroute call mode circuit 301. Reroute call mode circuit 301 resets the present call mode and permits the selected rerouting treatment subsequence circuit to function, in this case, station subsequence circuit 310. Upon completion of the rerouting process, the appropriate rerouting treatment subsequence circuit places a low signal on its output lead connected to gate 326 of pulse generator comprising gates 323, 324, 326 and capacitor 325. In the instant case, station subsequence circuit 310 placed a low signal on lead SS causing the aforementioned pulse generator to generate a low signal pulse in a manner analogous to that of the aforementioned pulse generator comprising gates 338, 339, 340 and capacitor 351. The low pulse signal on the output of gate 323, lead CLR, resets the flip-flops in restriction assignment circuit 103, restriction definition circuit 105, and register number store 327 as well as resetting reroute call mode circuit 301. Reroute call mode circuit 301 relinquishes control of the call processing to mode control circuit 300, which can now proceed in normal fashion to process call service requests.

Wherein the details of a particular call rerouting scheme were disclosed above, it is patently obvious that the disclosed call restriction arrangement has the flexibility to handle many other cell rerouting situations. The following material delves into various aspects of the disclosed restriction and rerouting circuitry to more fully describe the capabilities of the disclosed call restriction arrangement.

Inward/Outward Restriction

In particular, whereas the call described above was an attempted outgoing central office call originated by a subscriber at a restricted station, the disclosed call restriction facilities also operate on incoming calls. The class of service of the station receiving an incoming call is determined by the telephone switching system before the call is allowed to terminate on that station. Restriction definition circuit 105 has the capability to define restrictions on either outgoing or incoming calls. Cross-connect terminals ICR0 to ICR9 define incoming restrictions in a manner similar to that described above for the outgoing restrictions associated with cross-connect terminals OCR0 through OCR9. Thus, if for example, restriction type zero were an inward terminating restriction, then terminal RO* would be cross-connected to one of the inward restriction terminals ICR0 through ICR9. The restriction definition circuit would then function in a manner analogous to that described above for an outward going restricted call. Restriction definition circuit 105 would reroute the call to an alternate destination, the destination being selected by the rerouting destination assignment circuit 109.

Alternating Rerouting Treatments

Whereas the call described above was rerouted to another station in the telephone system, there are a number of alternate destinations available to which the call could have been rerouted. In particular, the call could have been rerouted to another telephone station in the system, whose number is dependent on the dialed number. For example, in a system where telephone numbers are assigned sequentially on a departmental basis, the boss would be assigned number XX00, his secretary would be assigned number XX01 and the employees being assigned the remaining numbers in that particular hundreds group. An employee prohibited from receiving incoming central office calls will have his incoming calls rerouted to the secretary at station XX01. This is accomplished by using cross-connect terminals 327AA to 327DA of register number store 327 to couple the reset signal on lead STA to only the tens and units digits stores 327C and 327D to expunge only the dialed tens and units digits. The rerouting destination assignment circuit 109 would then be cross-connected such that terminals ST8, ST2 and SU1 are connected to the output of gate 296 so that tens and units digits 01 are inputted into tens and units digits number stores 327C and 327D. Therefore, a subscriber at a station in the department receiving a prohibited incoming central office call will have his call terminated instead on the telephone of the secretary where the call can be screened.

Alternatively, treatment lead TRN could have been cross-connected in rerouting destination assignment circuit 109 to lead ROT, ATT or RAC indicating that the attempted prohibited call should be rerouted to a reorder tone trunk, to the attendant, or to the recalled announcement machine respectively. Activation of any one of these leads would trigger lead 321 of subsequence circuit 107 thereby activating the rerouting call